US012465997B2

(12) United States Patent
Aviles

(10) Patent No.: US 12,465,997 B2
(45) Date of Patent: Nov. 11, 2025

(54) HEAT-ABSORBING ADAPTER FOR ENHANCED HEAT DISSIPATION AND DURABILITY

(71) Applicant: Rocky Aviles, Rosharon, TX (US)

(72) Inventor: Rocky Aviles, Rosharon, TX (US)

( * ) Notice: Subject to any disclaimer, the term of this patent is extended or adjusted under 35 U.S.C. 154(b) by 0 days.

(21) Appl. No.: 18/983,370

(22) Filed: Dec. 17, 2024

(65) Prior Publication Data

US 2025/0114855 A1 Apr. 10, 2025

(51) Int. Cl.
*B23K 9/32* (2006.01)

(52) U.S. Cl.
CPC .................................... *B23K 9/323* (2013.01)

(58) Field of Classification Search
CPC ........ B23K 9/323; B23K 9/324; B23K 9/325; B23K 9/326
USPC ........................................................... 219/75
See application file for complete search history.

(56) References Cited

U.S. PATENT DOCUMENTS 3,238,350 A * 3/1966 Klasson ................. B23K 9/296 219/75
7,105,766 B2 * 9/2006 Samler ................... B23K 9/285 219/75
2014/0038442 A1 * 2/2014 Hung ..................... B23K 9/323 439/191
2020/0086414 A1 * 3/2020 Preundler .............. B23K 9/285

* cited by examiner

*Primary Examiner* — Chris Q Liu
*Assistant Examiner* — James F Sims, III
(74) *Attorney, Agent, or Firm* — Novel Patent Services LLC

(57) ABSTRACT

A tungsten inert gas (TIG) torch heat adapter is disclosed. The TIG torch heat adapter comprises a body, a first connection unit, a second connection unit, and a welding lead connector. The TIG torch heat adapter is a heat-absorbing adapter that is configured to connect the TIG torch head to the welding lead and the argon gas hose, providing enhanced heat dissipation and durability while ensuring secure and efficient connections. The TIG torch heat adapter is applicable in industrial, commercial, and hobbyist TIG welding operations where thermal management and reliability are critical. The TIG torch heat adapter mitigates heat-related issues, ensure secure connections for both the welding lead and argon gas hose, and enhance the overall durability and performance of a TIG torch. The TIG torch heat adapter enables welders to achieve higher productivity and longer operational lifespans for their equipment.

10 Claims, 3 Drawing Sheets

100

106

102

104

HEAT-ABSORBING ADAPTER FOR ENHANCED HEAT DISSIPATION AND DURABILITY

FIELD OF INVENTION

The present disclosure relates generally to welding equipment, and more particularly to a heat-absorbing adapter designed to connect a tungsten inert gas (TIG) torch head to a welding lead and an argon gas hose, providing enhanced heat dissipation and durability while ensuring secure and efficient connections.

BACKGROUND

Generally, welding can be classified into argon welding, gas welding, resistance welding and special welding. In the argon welding, an arc is formed between the electrode and the electrode by using discharge, and the welded portion is melted and welded by the heat generation.

When the argon welding is a metal or active metal having a high melting point, work is performed in a chamber filled with an inert gas because the welding site is contaminated by reacting with the atmosphere. Alternatively, after performing a welding operation with a welding electrode equipped with a nozzle in which inert gas is injected, a method of continuously injecting an inert gas until the welding portion is sufficiently cooled is used.

Tungsten inert gas (TIG) welding is a widely used welding technique that provides high precision and superior weld quality. It utilizes a non-consumable tungsten electrode to produce the weld and relies on argon gas to shield the welding area from atmospheric contamination. This process is commonly employed in industries such as automotive, aerospace, and fabrication due to its ability to produce clean and high-strength welds. A typical TIG welding setup includes a TIG torch, which houses the tungsten electrode, along with connections for a welding lead and an argon gas hose.

Despite its advantages, TIG welding presents certain challenges related to the performance and durability of the welding equipment. One critical component of the TIG welding process is the torch itself, which is subjected to significant heat and electrical stress during operation. The bottom portion of the TIG torch head, where the welding lead and argon gas hose connect, is particularly prone to overheating. This excessive heat can cause multiple problems, including thermal stress on the torch body, degradation of internal components, and even melting or damage to the welding lead.

Additionally, prolonged use of the TIG torch at high temperatures without adequate cooling may lead to breakage or deformation of the torch head. This not only interrupts welding operations but also increases downtime and maintenance costs. Current solutions, such as standard connectors, lack the necessary heat absorption and dissipation capabilities to address this issue effectively. As a result, welders are often forced to work with limited welding durations or resort to costly replacements of damaged components.

Therefore, there is a need for a tungsten inert gas (TIG) torch heat adapter that can mitigate heat-related issues, ensure secure connections for both the welding lead and argon gas hose, and enhance the overall durability and performance of a TIG torch. There is also a need for a tungsten inert gas (TIG) torch heat adapter that enables welders to achieve higher productivity and longer operational lifespans for their equipment.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a heat-absorbing adapter designed to connect a TIG torch head to a welding lead and an argon gas hose, providing enhanced heat dissipation and durability while ensuring secure and efficient connections.

An embodiment of a first aspect a tungsten inert gas (TIG) torch heat adapter. The TIG torch heat adapter comprises a body, a first connection unit, a second connection unit, and a welding lead connector. The TIG torch heat adapter is configured to absorb and dissipate heat generated by a welding lead during welding operations, reducing heat transfer to a tungsten inert gas (TIG) torch head and accelerating cooling between welding operations. The body is formed as a single, solid piece of 99.9% pure copper, ensuring superior heat absorption and efficient cooling. The body is configured to be adaptable to a plurality of TIG torches, ensuring compatibility with at least one of 26 and 26V series TIG torch heads.

In one embodiment, the body has a first end, and a second end, forming a longitudinal structure. The body further defines a gas passage (not shown) that extends through its interior along the longitudinal direction. The gas passage is designed to facilitate the controlled flow of argon gas from an external source, such as an argon gas tank, through the TIG torch heat adapter and into the TIG torch head.

In one embodiment, the first connection unit is positioned at the first end of the body. The first connection unit is configured for providing a means to attach the adapter to the TIG torch head. The first connection unit is configured to attach to a bottom portion of the TIG torch head. The first connection unit comprises a first threaded connection integrated with the first end of the body. The first threaded connection is designed to provide a secure and airtight fit with the TIG torch head.

In one embodiment, the second connection unit is positioned at the second end of the body. The second connection unit is configured to attach with an argon gas hose, thereby facilitating the seamless a flow of an argon gas into the gas passage within the body. The second connection unit comprises a second threaded connection that is configured to precisely match an inner contour and thread pattern of the argon gas hose, thereby ensuring a secure and reliable attachment of the argon gas hose to the body.

In one embodiment, the welding lead connector is positioned at the second end of the body. The welding lead connector is configured to securely attach the welding lead, ensuring a stable electrical connection between a TIG welding power source and the TIG torch heat adapter. The welding lead connector comprises a groove that is configured to securely attach the welding lead such as a 4-gauge welding lead. The TIG torch heat adapter comprises a gas passage extending longitudinally through the body to supply the argon gas to the TIG torch head through the gas passage.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1:
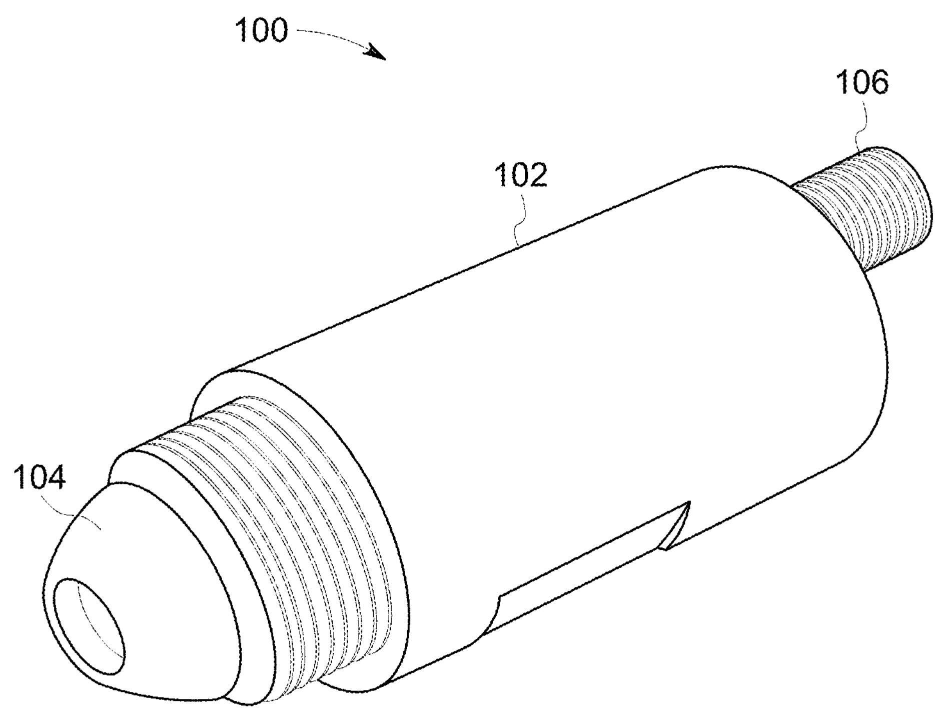
FIG. 1 illustrates a perspective front view of a tungsten inert gas (TIG) torch heat adapter, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a perspective front view of a tungsten inert gas (TIG) torch heat adapter 100. The TIG torch heat adapter 100 comprises a body 102, a first connection unit 104, a second connection unit 106, and a welding lead connector 108. The TIG torch heat adapter 100 is configured to absorb and dissipate heat generated by a welding lead during welding operations, reducing heat transfer to a tungsten inert gas (TIG) torch head and accelerating cooling between welding operations. The body 102 is made of at least 99.9% pure copper. The body 102 is configured to be adaptable to a plurality of TIG torches, ensuring compatibility with at least one of 26 and 26V series TIG torch heads. The body 102 is formed as a single, solid piece of 99.9% pure copper, ensuring superior heat absorption and efficient cooling. This design also enables the seamless flow of argon through the body 102, enhancing its overall functionality and performance.

In one embodiment, the body 102 has a first end, and a second end, forming a longitudinal structure. The body 102 further defines a gas passage (not shown) that extends through its interior along the longitudinal direction. The gas passage is designed to facilitate the controlled a flow of the argon gas from an external source, such as an argon gas tank, through the TIG torch heat adapter 100 and into the TIG torch head.

In one embodiment, the first connection unit 104 is positioned at the first end of the body 102. The first connection unit 104 is configured for providing a means to attach the adapter to the TIG torch head. The first connection unit 104 is configured to attach to a bottom portion of the TIG torch head. The first connection unit 104 comprises a first threaded connection integrated with the first end of the body 102. The first threaded connection is designed to provide a secure and airtight fit with the TIG torch head. The first threaded connection is manufactured to industry-standard specifications compatible with 26 and 26V TIG torch heads, ensuring universal compatibility. The integration of the first threaded connection into the first end of the body 102 enhances durability and reduces the risk of loosening or gas leakage during prolonged welding operations. The first connection unit's design simplifies the attachment process, allowing for quick and reliable connection of the TIG torch head to the TIG torch heat adapter 100.

In one embodiment, the second connection unit 106 is positioned at the second end of the body 102. The second connection unit 106 is configured to attach with an argon gas hose, thereby facilitating the seamless flow of argon gas into the gas passage within the body 102. The second connection unit 106 comprises a connection pipe with a threaded connection that is configured to precisely match an inner contour and thread pattern of the argon gas hose, thereby ensuring a secure and reliable attachment of the argon gas hose to the body 102.

In one embodiment, the welding lead connector 108 is positioned at the second end of the body 102. The welding lead connector 108 is configured to securely attach the welding lead, ensuring a stable electrical connection between a TIG welding power source and the TIG torch heat adapter 100. The welding lead connector 108 comprises a groove that is configured to securely attach the welding lead such as a 4-gauge welding lead.

Figure 2:
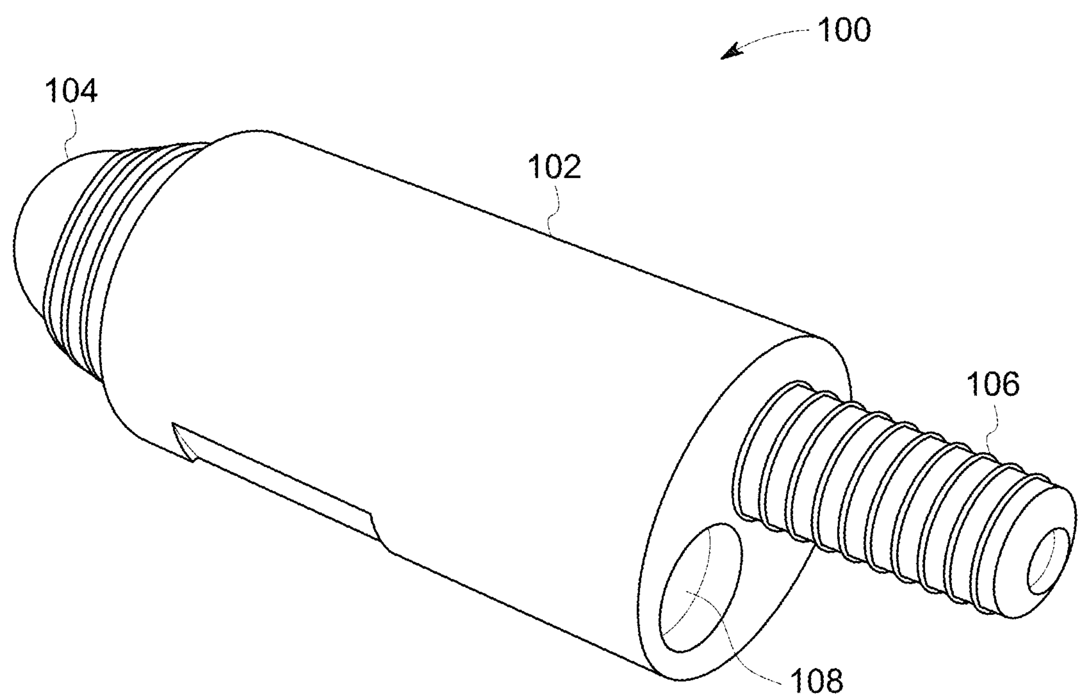
FIG. 2 illustrates a perspective rear view of the TIG torch heat adapter, in accordance with embodiments of the invention.

FIG. 2 refers to a perspective rear view of the TIG torch heat adapter 100. The second connection unit 106 comprises the connection pipe that is designed to match an inner shape and thread pattern of the argon gas hose, thereby securely attaching the argon gas hose to the body 102. This precise design ensures a secure and leak-proof attachment, even under high-pressure conditions. The second connection unit's compatibility with standard argon gas hoses used in TIG welding systems makes the adapter versatile and suitable for a variety of welding setups. The robust connection also minimizes the risk of accidental disconnection or gas leakage during welding operations, maintaining the integrity of the shielding gas supply.

In one embodiment, the welding lead connector 108 is designed to securely attach the welding lead, ensuring a stable electrical connection between the TIG welding power source and the adapter. The welding lead connector 108 comprises the groove, which is engineered to accommodate and securely hold a 4-gauge welding lead. This groove is designed with a compression fit mechanism, allowing the welding lead to be firmly inserted and locked in place. The secure attachment prevents disconnection or loosening of the welding lead during high-current welding operations, ensuring consistent arc stability. The positioning of the welding lead connector 108 alongside the second connection unit 106 allows for efficient use of space while maintaining functional separation between the electrical and gas connections, reducing the risk of interference or overheating.

Figure 3:
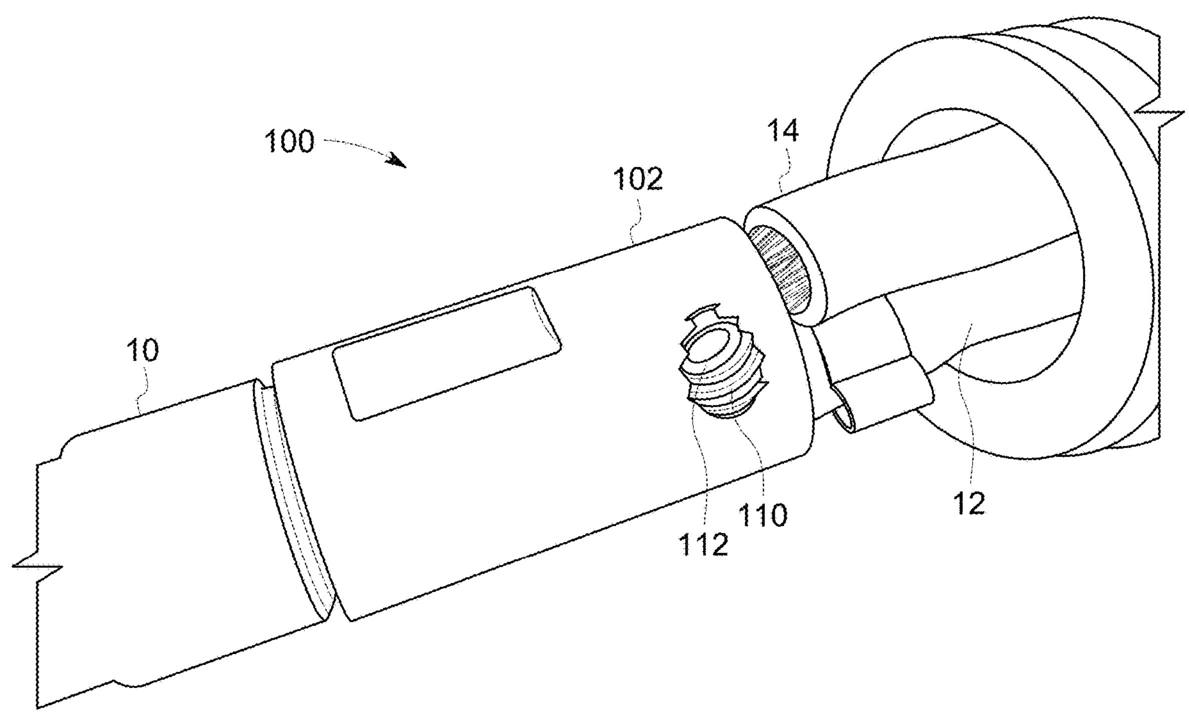
FIG. 3 illustrates a perspective view of the TIG torch heat adapter attached with a TIG torch head, an argon gas hose, and a welding lead, in accordance with embodiments of the invention.

FIG. 3 refers to a perspective view of the TIG torch heat adapter 100 attached with the TIG torch head 10, the argon gas hose 12, and the welding lead 14. The welding lead connector 108 is designed to extend from the bottom toward the top of the TIG torch heat adapter 100 at a predetermined depth within the body 102. Further, the TIG torch heat adapter 100 includes a bolt hole 110, which is formed to extend from the outer periphery of the body 102 to the welding lead connector 108.

In a preferred embodiment, the welding lead 14 is securely connected to the welding lead connector 108. When the welding lead 14 is inserted into the welding lead connector 108, the welding lead 14 can be firmly secured by tightening a bolt 112 within the bolt hole 110. As the bolt 112 is tightened, the bolt 112 applies direct pressure to the welding lead 14, ensuring a stable and secure connection. This arrangement prevents the welding lead 14 from becoming dislodged during operation. The straightforward design of the bolt hole 110 allows the welding lead 14 to be easily connected to the TIG torch heat adapter 100 without requiring complex tools or procedures.

In one embodiment, the gas passage is formed within the body 102, which runs longitudinally through portions of the TIG torch heat adapter 100 that are not occupied by the welding lead connector 108. The gas passage is strategically positioned to allow optimal integration with the TIG torch head 10. When the TIG torch heat adapter 100 is coupled to the TIG torch head 10, the gas passage aligns and communicates with a corresponding gas passage in the TIG torch head 10, facilitating the supply of argon gas to the TIG torch head 10 for shielding purposes.

To ensure seamless connection with the argon gas supply system, the inlet side of the gas passage is equipped with the second connection unit 106. The second connection unit 106 enables a quick and secure connection to the argon gas hose 12, simplifying the setup process and ensuring reliable gas flow during operation.

In one embodiment, the TIG torch heat adapter 100 is a heat-absorbing adapter that is designed to connect the TIG torch head to the welding lead and the argon gas hose, providing enhanced heat dissipation and durability while ensuring secure and efficient connections. The TIG torch heat adapter 100 is applicable in industrial, commercial, and hobbyist TIG welding operations where thermal management and reliability are critical. The TIG torch heat adapter is configured to mitigate heat-related issues, ensure secure connections for both the welding lead and argon gas hose, and enhance the overall durability and performance of a TIG torch. TIG torch heat adapter enables welders to achieve higher productivity and longer operational lifespans for their equipment.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

What is claimed is:

1. A tungsten inert gas (TIG) torch heat adapter, comprising:

a body having a first end and a second end, wherein the body is formed as a single solid piece;

a first connection unit positioned at the first end, wherein the first connection unit is configured to attach to a bottom portion of a tungsten inert gas (TIG) torch head;

a second connection unit positioned at the second end, wherein the second connection unit is configured to attached with an argon gas hose, thereby facilitating a flow of an argon gas; and a welding lead connector positioned at the second end, wherein the welding lead connector is configured to securely attach a welding lead, wherein the TIG torch heat adapter is configured to absorb and dissipate heat generated by the welding lead during welding operations, thereby reducing heat transfer to the TIG head and accelerating cooling between welding operation, wherein the body comprises a first threaded connection having dimensions and thread pitch matching those of a 26 or 26V series TIG torch head, thereby ensuring compatibility with a plurality of TIG torch heads including at least one of the 26 and 26V series.

2. The tungsten inert gas (TIG) torch heat adapter of claim 1, wherein the body is made of 99.9% pure copper.

3. The tungsten inert gas (TIG) torch heat adapter of claim 1, wherein the second connection unit comprises a second threaded connection that is configured to precisely match an inner contour of an argon gas hose, thereby ensuring a secure and reliable attachment of the argon gas hose to the body.

4. The tungsten inert gas (TIG) torch heat adapter of claim 1, wherein the welding lead connector comprises a groove that is configured to securely attach to the welding lead.

5. The tungsten inert gas (TIG) torch heat adapter of claim 1, wherein the TIG torch heat adapter comprises a gas passage extending longitudinally through the body to supply the argon gas to the TIG torch head through the gas passage.

6. A tungsten inert gas (TIG) torch heat adapter, comprising: a body formed as a single solid piece of 99.9% pure copper;

a first threaded connection positioned at a first end of the body, wherein the first threaded connection is configured to attach to a bottom portion of a tungsten inert gas (TIG) head;

a second threaded connection positioned at a second end of the body, wherein the second threaded connection is configured to attach with an argon gas hose, thereby facilitating a flow of an argon gas; and a welding lead connector positioned at the second end, wherein the welding lead connector is configured to securely attach to a welding lead, wherein the TIG torch heat adapter is configured to absorb and dissipate heat generated by the welding lead during welding operations, thereby reducing heat transfer to the TIG head and accelerating cooling between welding operations.

7. The tungsten inert gas (TIG) torch heat adapter of claim 6, wherein the body comprises a first threaded connection having dimensions and thread pitch matching those of a 26 or 26V series TIG torch head, thereby ensuring compatibility with a plurality of TIG torch heads including at least one of the 26 and 26V series.

8. The tungsten inert gas (TIG) torch heat adapter of claim 6, wherein the second threaded connection is configured to precisely match an inner contour of an argon gas hose, thereby ensuring a secure and reliable attachment of the argon gas hose to the body.

9. The tungsten inert gas (TIG) torch heat adapter of claim 6, wherein the welding lead connector comprises a groove that is configured to securely attach to the welding lead.

10. The tungsten inert gas (TIG) torch heat adapter of claim 6, wherein the TIG torch heat adapter comprises a gas passage extending longitudinally through the body to supply the argon gas to the TIG torch head through the gas passage.

* * * * *